(12) United States Patent
Schnitkey

(10) Patent No.: US 10,246,265 B2
(45) Date of Patent: Apr. 2, 2019

(54) BELT CONVEYOR SYSTEM

(71) Applicant: Custom Agri Systems, Inc., Napoleon, OH (US)

(72) Inventor: Joshua Norman Schnitkey, Wauseon, OH (US)

(73) Assignee: Custom Agri Systems, Inc., Napoleon, OH (US)

( * ) Notice: Subject to any disclaimer, the term of this patent is extended or adjusted under 35 U.S.C. 154(b) by 0 days.

(21) Appl. No.: 15/863,620

(22) Filed: Jan. 5, 2018

(65) Prior Publication Data

US 2018/0194567 A1    Jul. 12, 2018

Related U.S. Application Data

(60) Provisional application No. 62/445,523, filed on Jan. 12, 2017.

(51) Int. Cl.
| | |
|---|---|
| *B65G 15/08* | (2006.01) |
| *B65G 39/09* | (2006.01) |
| *B65G 39/12* | (2006.01) |
| *B65G 69/18* | (2006.01) |

(52) U.S. Cl.
CPC ............. *B65G 39/09* (2013.01); *B65G 15/08* (2013.01); *B65G 39/12* (2013.01); *B65G 69/181* (2013.01); *B65G 2201/04* (2013.01); *B65G 2812/02158* (2013.01); *B65G 2812/02168* (2013.01)

(58) Field of Classification Search
CPC ...... B65G 39/09; B65G 39/12; B65G 39/125; B65G 39/10; B65G 15/08

USPC .................................................. 198/817–830
See application file for complete search history.

(56) References Cited

U.S. PATENT DOCUMENTS

| | | | | |
|---|---|---|---|---|
| 3,447,448 | A | * | 6/1969 | Pasic ........................ B65B 13/06 198/817 |
| 3,877,568 | A | * | 4/1975 | Breiling .................. B65G 39/10 198/842 |
| 4,204,594 | A | | 5/1980 | Banno |
| 4,230,222 | A | | 10/1980 | Clark |
| 5,028,149 | A | * | 7/1991 | Hardtke .................. B65G 39/12 138/107 |
| 5,074,408 | A | | 12/1991 | Smith et al. |
| 6,044,965 | A | | 4/2000 | Clark |
| 6,102,195 | A | | 8/2000 | Weikel |
| 6,296,106 | B1 | | 10/2001 | Marchesini |
| 6,681,919 | B1 | | 1/2004 | Brink |
| 6,681,921 | B1 | * | 1/2004 | Schroeder .............. B65G 19/08 198/493 |
| 7,243,782 | B2 | * | 7/2007 | Schlagel ................ B65G 21/08 198/816 |

(Continued)

FOREIGN PATENT DOCUMENTS

GB            287746 A        3/1928

*Primary Examiner* — James R Bidwell
(74) *Attorney, Agent, or Firm* — Marshall & Melhorn, LLC

(57) ABSTRACT

A belt conveyor system including an elongate housing having at least one troughing idler assembly disposed therein. The troughing idler assembly includes a center medial roller and a plurality of side rollers. Each of the rollers includes a shaft having ends supported by at least one bearing having a first face and a second face. The bearings supporting the side rollers are mounted to an exterior of the elongate housing in such a manner that the first face and the second face of at least one of the bearings are visible.

14 Claims, 8 Drawing Sheets

(56) References Cited

U.S. PATENT DOCUMENTS

| | | |
|---|---|---|
| 7,839,294 B2 | 11/2010 | Orlowski et al. |
| 7,882,945 B2 | 2/2011 | Willi et al. |
| 8,130,113 B1 | 3/2012 | Orlowski et al. |
| 8,225,926 B1 | 7/2012 | Anderson et al. |
| 2003/0034232 A1* | 2/2003 | Kaeb ............... B65G 15/08 198/819 |
| 2014/0262695 A1* | 9/2014 | Hoffmann ............... B65G 15/60 198/837 |
| 2016/0264358 A1 | 9/2016 | Kuiper et al. |

* cited by examiner

BELT CONVEYOR SYSTEM

CROSS REFERENCE TO RELATED APPLICATION

This application is entitled to claim the benefit of, and claims priority to, U.S. provisional patent application Ser. No. 62/445,523 filed Jan. 12, 2017, the entire disclosure of which is incorporated herein by reference.

FIELD OF THE INVENTION

The present invention relates generally to a belt conveyor system and, more particularly, to a bearing arrangement for a belt conveyor system.

BACKGROUND OF THE INVENTION

Belt conveyor systems are employed to convey a great variety of bulk loads between various storage units along a horizontal and gently inclined or declined path. Such belt conveyor systems are commonly used to carry mining materials, food grains, and building materials. A typical belt conveyor system includes a driving pulley at a head end, and a take up pulley at a tail end, both being accommodated in a rigid frame. An endless belt connects the two pulleys on both a conveying run and a returning run, and is supported by suitable roller type supports, called idlers.

In certain applications, the material being conveyed is loaded on the belt conveyor system by one or more feed hoppers mounted over the belt conveyor system, and typically disposed at the tail end. The material load conveyed by the moving belt is then discharged over the driving pulley into a discharge spout. However, the material being conveyed can be loaded and/or discharged at any point, or multiple points, along the conveying run. A take up arrangement is disposed at the tail end of the belt conveyor system to keep the belt under a minimum tension so that the belt does not slip over the pulleys due to extension of its length.

A troughed belt conveyor system is that in which the belt forms a trough on a carrying side while running over the idlers and is substantially planar on a return side while running over a return roller. Each of the idlers includes rollers having a shaft journaled in bearings. The shafts and bearings are prone to buildups of dust or particulates. Such buildup on the bearings may lead to increased friction and bearing failure, which can cause ignition of the combustible dust or particulates. Additional lubrication of the bearings to mitigate against bearing failure may lead to further buildup of dust and leakage of the additional lubrication onto the material being conveyed, resulting in contamination thereof.

It would be desirable to produce a bearing arrangement for a belt conveyor system which enhances equipment maintenance and safety, as well as militates against equipment failure and exposure to combustible dust and particulates, and material contamination.

SUMMARY OF THE INVENTION

In concordance and agreement with the present disclosure, a bearing arrangement for a belt conveyor system which enhances equipment maintenance and safety, as well as militates against equipment failure and exposure to combustible dust and particulates, and material contamination, has surprisingly been discovered.

In one embodiment, the belt conveyor system, comprises: a main housing; and a troughing idler assembly disposed in the main housing, the troughing idler assembly including at least one roller supported by a first bearing having a first face and a second face, wherein the first bearing is mounted to an exterior of the main housing, wherein the first face and the second face of the first bearing are at least partially visible.

In another embodiment, the belt conveyor system, comprises: a main housing including a conveyor belt disposed therein, wherein the conveyor belt is configured to convey a material disposed within the main housing; a bearing bracket housing mounted to an exterior of the main housing; and a first bearing having a first face and a second face, wherein the first bearing is disposed in the bearing bracket housing, wherein the first face and the second face of the first bearing are at least partially visible to a user.

In yet another embodiment, the belt conveyor system, comprises: a main housing; and a first bearing disposed outside of the main housing, wherein a first face and an opposing second face of the first bearing are at least partially visible to a user during operation of the belt conveyor system.

BRIEF DESCRIPTION OF THE DRAWINGS

The above, as well as other objects and advantages of the invention, will become readily apparent to those skilled in the art from a reading of the following detailed description of the invention when considered in the light of the accompanying drawings in which.

DETAILED DESCRIPTION OF THE INVENTION

Figure 1:
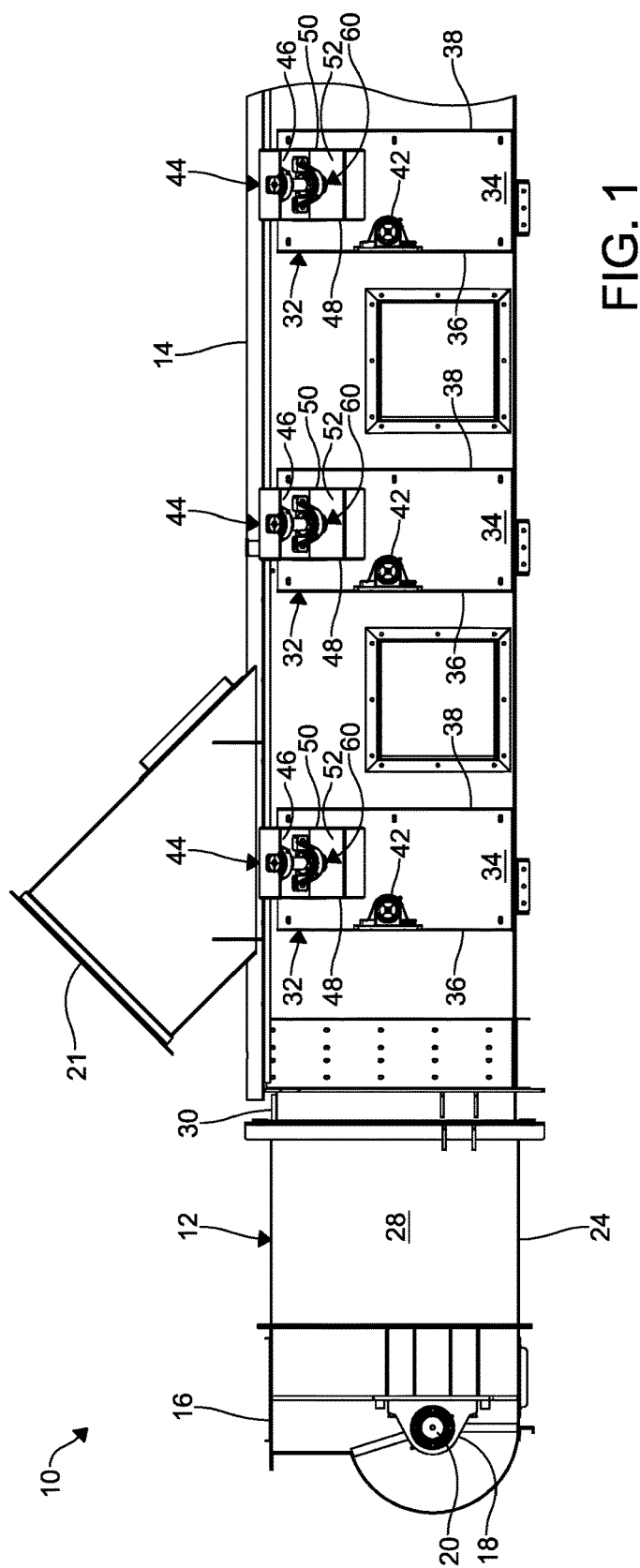
FIG. 1 is a fragmentary side elevational view of a belt conveyor system according to an embodiment of the present invention.
Figure 2:
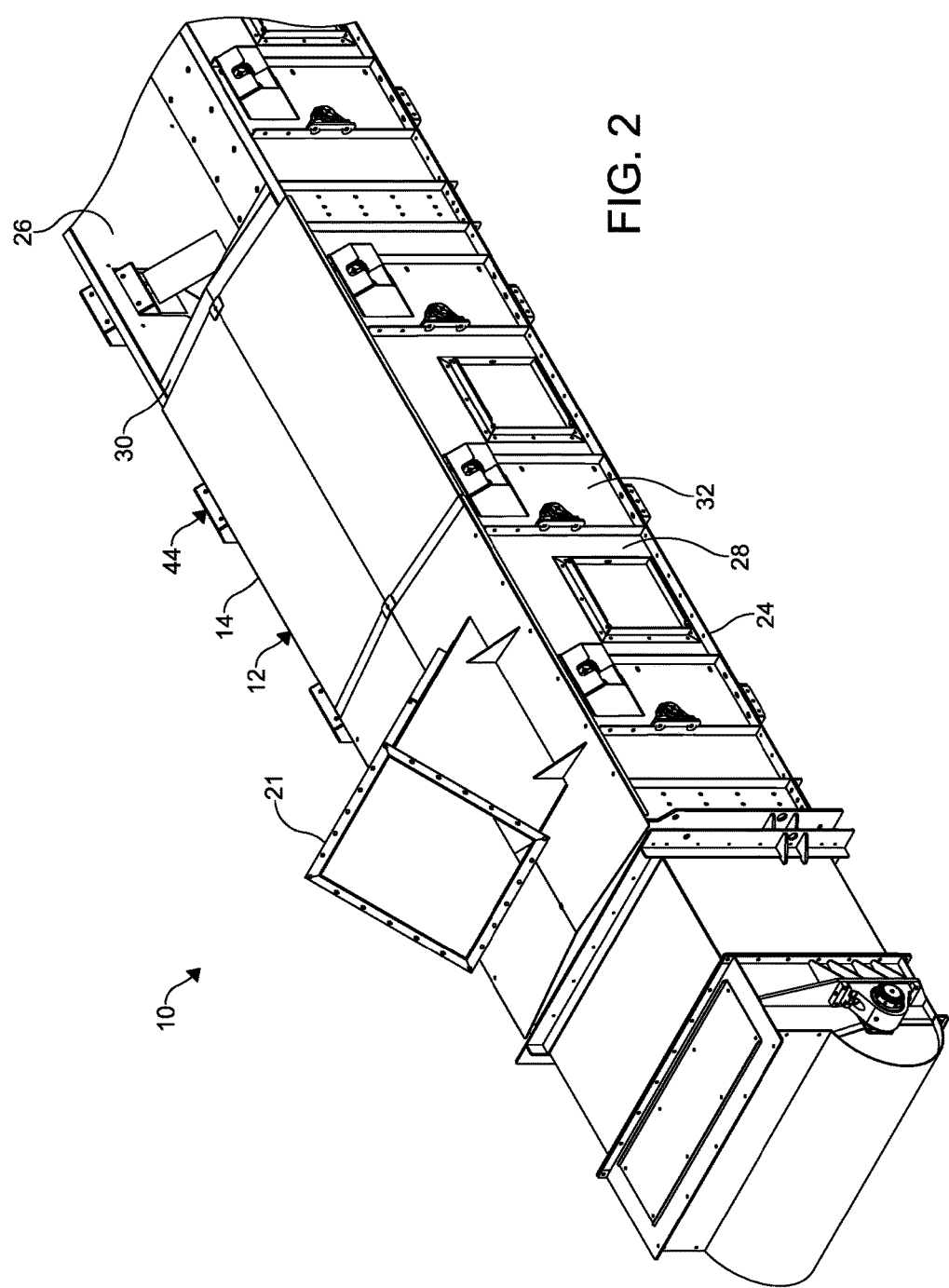
FIG. 2 is a fragmentary side perspective view of the belt conveyor system shown in FIG. 1.

The following detailed description and appended drawings describe and illustrate various exemplary embodiments of the invention. The description and drawings serve to enable one skilled in the art to make and use the invention, and are not intended to limit the scope of the invention in any manner.

FIGS. 1-5 depict at least a portion of a belt conveyor system 10 according to the present invention. The belt conveyor system 10 includes an elongated housing 12 formed by a plurality of conveyor body or housing sections 14 coupled together in an end-to-end manner. The belt conveyor system 10 also includes a tail end 16 shown in FIGS. 1-2 and a head end (not shown). A conventional drive motor (not shown) drives a head pulley (not shown) which drives a conveyor belt 17, shown in FIG. 3, disposed within the housing 12. The conveyor belt 17 is trained at the tail end 16 around a tail pulley 18, which is supported by bearings 20, and at the head end by the head pulley. Material 19 to be conveyed is received into the housing 12 of the belt conveyor system 10 through a material inlet 21 shown in FIGS. 1-2. Although only one material inlet 21 is shown, it is understood that the belt conveyor system 10 may include additional material inlets 21 along a conveying run if desired. The conveyor belt 17 carries the material 19 supplied at the tail end 16 and returns to the tail end 16 by sliding along a floor of the housing 12, which is lined with a return liner 22 shown in FIG. 3. It is understood that the return liner 22 can be formed from any material as is known in the art such as anti-static ultra-high molecular weight polyethylene, for example. Once the material 19 has reached a desired location, the material 19 is then discharged through a discharge spout (not shown). It is understood that the belt conveyor system 10 may include numerous discharge spouts along the conveying run if desired.

For simplicity, only one of the conveyor housing sections 14 is described hereinafter, it being understood that a typical belt conveyor system will have many more substantially identical conveyor housing sections 14. One of ordinary skill in the art should further understand that more than one conveyor housing section 14 may be used within the scope of the invention.

The housing section 14 shown includes a bottom wall 24, opposite side walls 26 and 28, and an upper wall 30. Each of the side walls 26, 28 includes an opening (not shown) formed therein. Upstanding bearing brackets 32 are bolted to an exterior of each of the side walls 26, 28 of the housing section 14. In one embodiment, the bearing brackets 32 are secured to each of the side walls 26, 28 in a horizontally spaced-apart manner. The number of bearing brackets 32 secured to each of the side walls 26, 28 depends upon a length of the housing sections 14. As shown in FIG. 1, each of the bearing brackets 32 includes a base portion 34 and opposing side flanges 36, 38. An opening (not shown) is formed in an upper portion of the base portion 34 of each of the bearing brackets 32 for alignment with the opening formed in the housing section 14. A bearing 42 is secured to each of the bearing brackets 32 by any means as desired such as by mechanical fasteners, for example.

Figure 3:
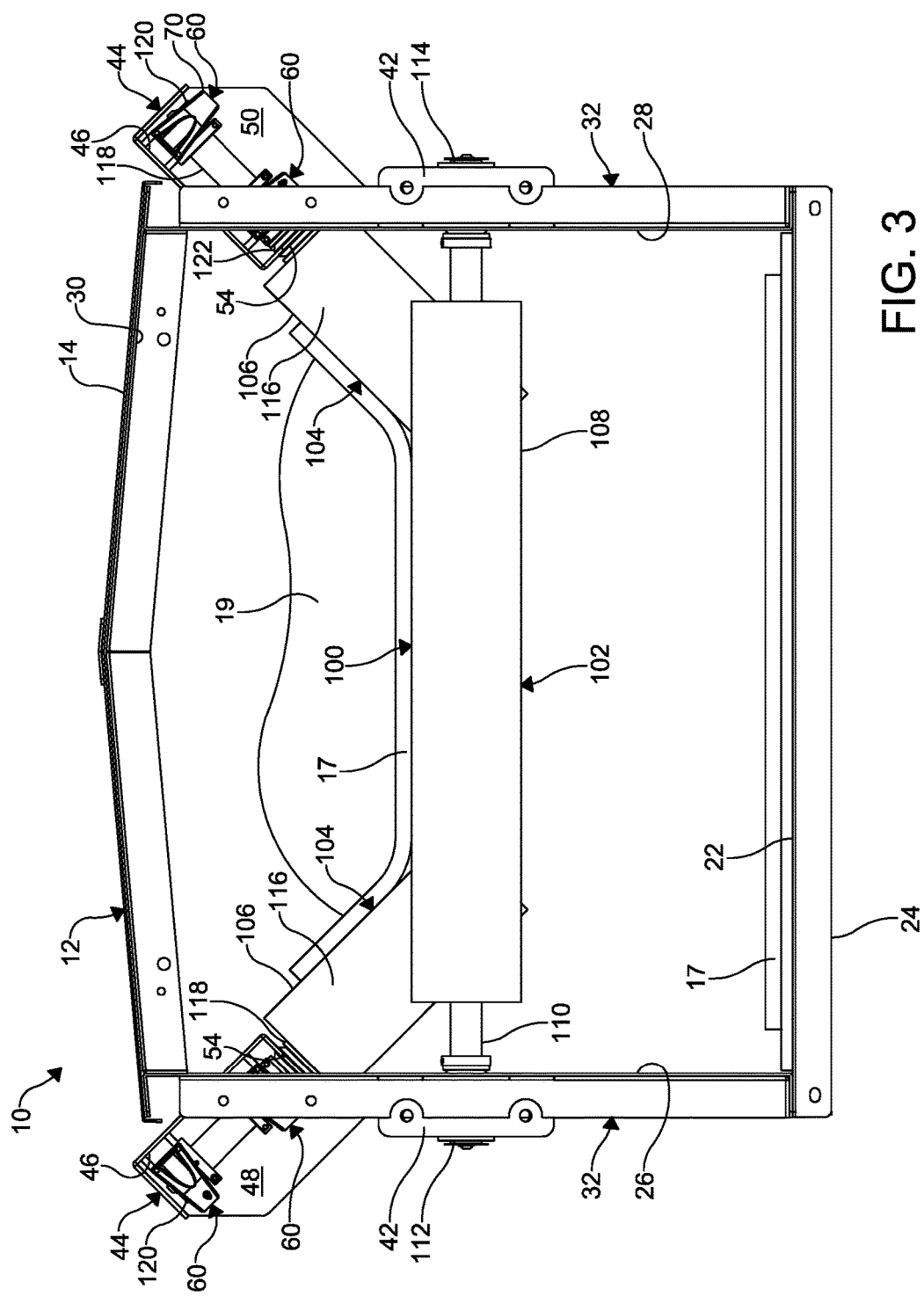
FIG. 3 is a front elevational view of a housing section of the belt conveyor system shown in FIGS. 1 and 2, wherein a portion of a bearing bracket housing is removed to show a bearing arrangement according to an embodiment of the present invention.

An angularly disposed bearing bracket housing 44 is also secured to each of the bearing brackets 32 by any means as desired such as by welding, mechanical fasteners, or the like, for example. Each of the bearing bracket housings 44 includes an inclined upper wall 46, side walls 48, 50, and an inner end wall 52. As shown in FIG. 3, the inner end wall 52 has a central opening 54 formed therein. In certain embodiments shown in FIG. 5, the bearing bracket housing 44 also includes an outer end wall 56 having an opening (not shown) formed therein.

Figure 4:
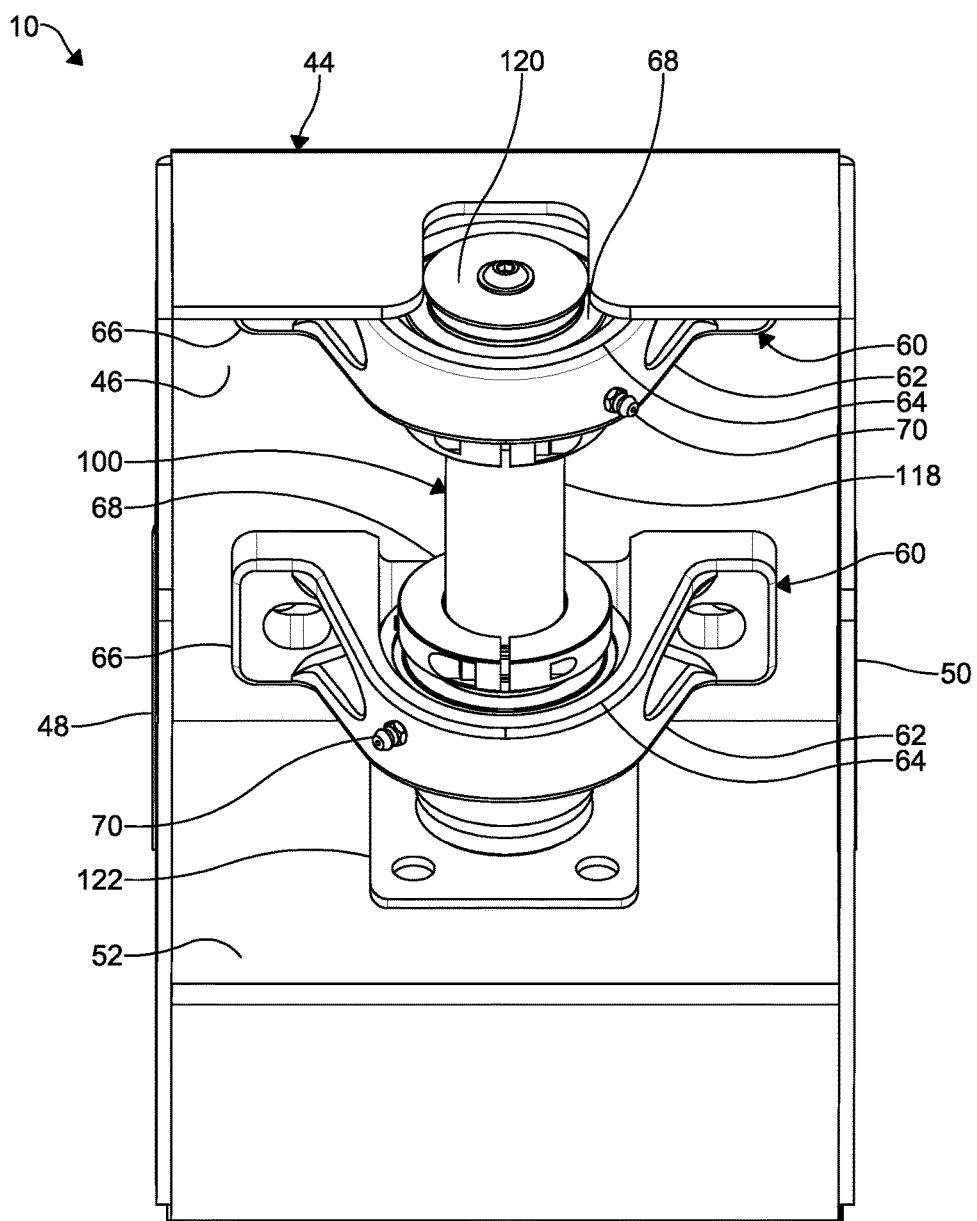
FIG. 4 is a side perspective view of a portion of the belt conveyor system shown in FIGS. 1-3, wherein a portion of a bearing bracket housing is removed to show a bearing arrangement according to an embodiment of the present invention.

In one embodiment of the present invention shown in FIGS. 1-4, a pair of pillow block bearings 60 is coupled to the upper wall 46 of the bearing bracket housing 44. It is understood that the bearings 60 can be coupled to the upper wall 46 by any means as desired such as by mechanical fasteners, for example. As illustrated in FIG. 4, each of the bearings 60 has a first face 62, an opposing second face 64, and includes a frame 66 having an inner ring 68 rotatably mounted therein. It is understood that the bearings 60 can be any type of pillow block bearings known in the art. Each of the bearings 60 may also include a lubrication fitting or zerk fitting 70 to enable the bearing 60 to be lubricated. As shown in FIGS. 1-4, the bearings 60 are mounted in such arrangement that both the first face 62 and the second face 64 of the bearings 60 are exposed, visible, and accessible. Visibility and accessibility of both of the faces 62, 64 enhances maintenance and safety of the belt conveyor system 10 by allowing inspection of both of the faces 62, 64 to substantially minimize failure of the bearings 60, and therefore, a potential ignition of a combustible dust created by the material 19 being conveyed. Additionally, the bearings 60 are disposed on an exterior of the housing sections 14 away from the combustible dust within the housing 12, and therefore, the potential ignition of the combustible dust is further minimized.

Figure 5:
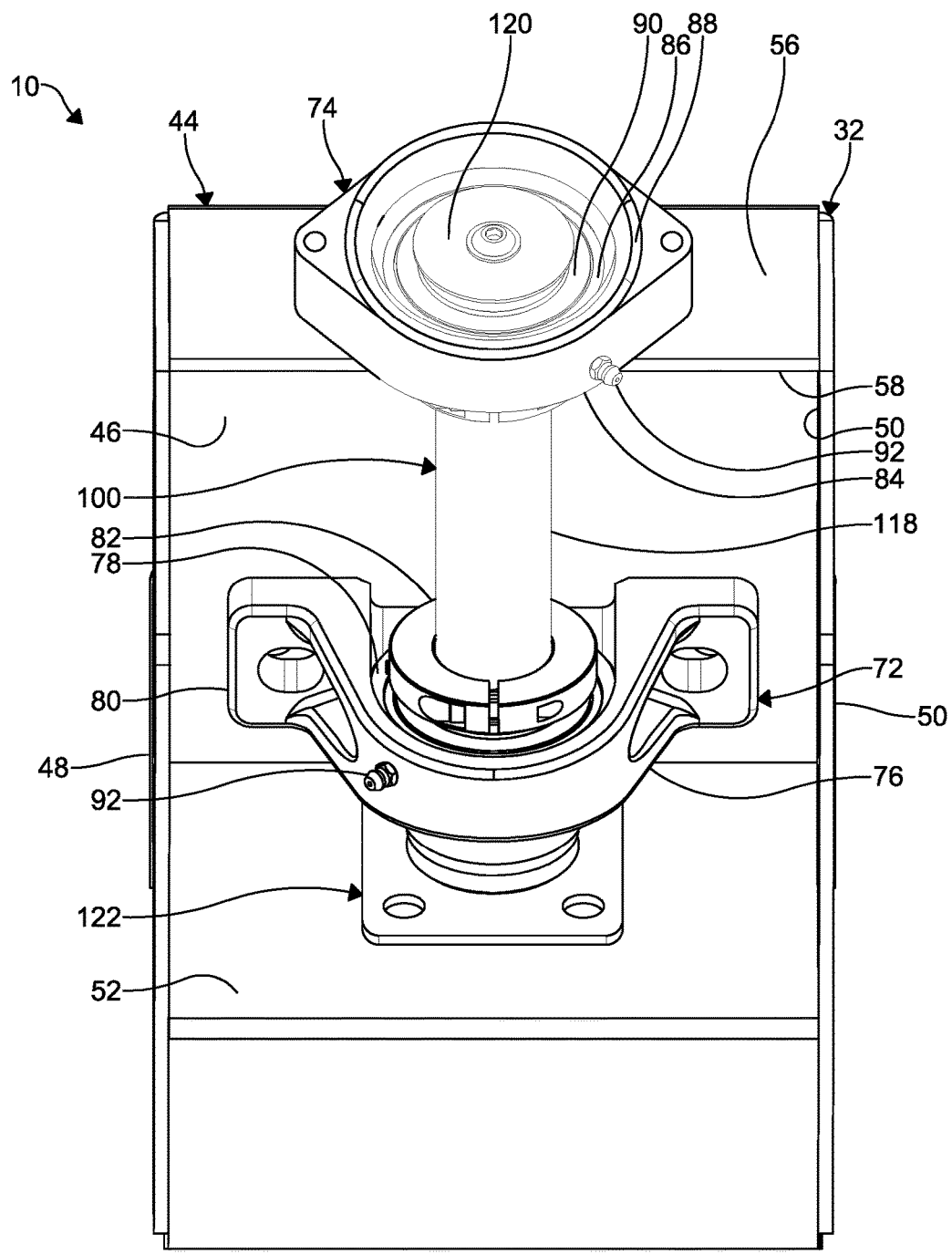
FIG. 5 is a side perspective view of a portion of the belt conveyor system shown in FIGS. 1-3, wherein a portion of the bearing bracket housing is removed to show a bearing arrangement according to another embodiment of the invention.

In another embodiment of the present invention shown in FIG. 5, at least one pillow block bearing 72 is coupled to the upper wall 46 of the bearing bracket housing 44 and at least one flange bearing 74 is coupled to the outer end wall 56 of the bearing bracket housing 44. It is understood that the bearings 72, 74 can be coupled to a respective one of the walls 46, 56 of the bearing bracket housing 44 by any means as desired such as by mechanical fasteners, for example. The bearing 72 has a first face 76, an opposing second face 78, and includes a frame 80 having an inner ring 82 rotatably disposed therein. It is also understood that the bearing 72 can be any type of pillow block bearing known in the art. The bearing 74 has a first face 84, an opposing second face 86, and includes a flanged frame 88 having an inner ring 90 rotatably disposed therein. The bearing 74 can be any type of flange bearing known in the art. Each of the bearings 72, 74 may include a lubrication fitting or zerk fitting 92, shown in FIG. 5, to enable the bearings 72, 74 to be lubricated.

As illustrated, the bearing 72 is mounted in such arrangement that both the first face 76 and the second face 78 of the bearing 72 are exposed, visible, and accessible. Visibility and accessibility of both of the faces 76, 78 enhances maintenance and safety of the belt conveyor system 10 by allowing inspection of both of the faces 76, 78 to substantially minimize failure of the bearing 72, and therefore, a potential ignition of a combustible dust created by the material 19 being conveyed. The bearing 74 is also mounted in such arrangement that the bearing 74 is accessible and at least one of the faces 84, 86 is visible. Accessibility of the bearing 74 enhances maintenance and safety of the belt conveyor system 10 by allowing inspection to substantially minimize failure of the bearing 74, and therefore, a potential ignition of the combustible dust created by the material 19 being conveyed. Additionally, the bearings 72, 74 are disposed on an exterior of the housing sections 14 away from the combustible dust within the housing 12, and therefore, the potential ignition of the combustible dust is further minimized.

A cover (not shown) is selectively secured to the bearing bracket housing 44 by any means as desired such as by mechanical fasteners, for example. The cover is configured to provide closure to the bearing bracket housing 44 and minimize inadvertent access to an interior thereof. Openings (not shown) may be formed in the cover which are aligned with the lubrication fittings or zerk fittings 70, 92 of the bearings 60, 72, 74 to enable the bearings 60, 72, 74 to be lubricated without removing the cover.

In the embodiments shown in FIGS. 1-5, the belt conveyor system 10 includes a plurality of troughing idler assemblies 100 disposed therein. For simplicity, only one of the troughing idler assemblies 100 is described hereinafter, it being understood that a typical belt conveyor system will have many more substantially identical troughing idler assemblies 100. One of ordinary skill in the art should further understand that more than one troughing idler assembly 100 may be used within the scope of the invention.

Each of the troughing idler assemblies 100 includes a center medial roller 102 and a pair of spaced apart angularly disposed troughing side idler assemblies 104, each having a side idler roller 106. As illustrated, the medial roller 102 and the side idler rollers 106 are arranged relative to each other so as to support the conveyor belt 17 with side portions of the conveyor belt 17 sloping upwardly and outwardly with respect to a medial portion of the conveyor belt 17.

In the embodiment shown, the medial roller 102 includes a tubular body 108 coupled to an elongate shaft 110. Each end 112, 114 of the shaft 110 pass through a respective one of the side walls 26, 28 of the housing section 14 and are rotatably supported by a respective one of the bearings 42 coupled to the bearing brackets 32. Similarly, each of the side idler rollers 106 includes a tubular body 116 coupled to an elongate shaft 118. The shaft 118 has an upper first end 120 and a lower second end (not shown). The first end 120 of the shaft 118 extends through the opening formed in the housing section 14, through an opening 54 formed in the bearing bracket housing 44 and into the bearing bracket housing 44, where the first end 120 of the shaft 118 is received and supported by the bearings 60 in one embodiment of the present invention or the bearings 72, 74 in another embodiment of the present invention.

A seal 122 may be disposed in at least one of the openings formed in the sidewalls 26, 28 of the housing section 14 to surround the shaft 110 of the medial roller 102 and militate against exposure of the bearings 42 to the combustible dust within the housing 12, as well as militate against contamination of the material 19 being conveyed with the lubrication used for the bearings 42. The seal 122 may also be disposed in at least one of the openings formed in the sidewalls 26, 28 of the housing sections 14, the openings formed in the bearing brackets 32, and the openings 54 formed in the bearing bracket housings 44 to surround the shaft 118 of the side idler rollers 106 and militate against exposure of the bearings 60, 72, 74 to the combustible dust within the housing 12, as well as militate against contamination of the material 19 being conveyed with the lubrication used for the bearings 60, 72. 74.

Figure 8:
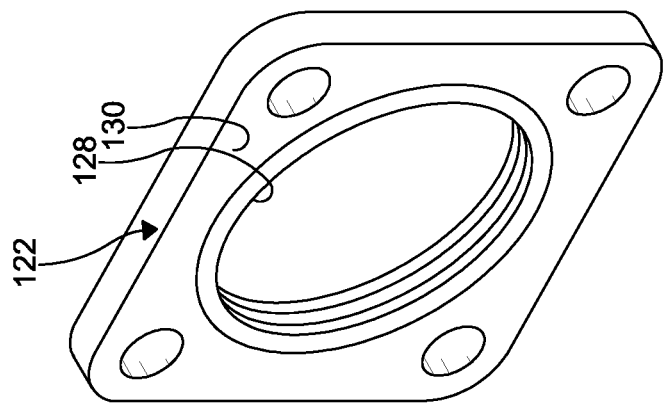
FIGS. 6-11 are side perspective views of various seals that are employed in the belt conveyor system shown in FIGS. 1-5.
Figure 7:
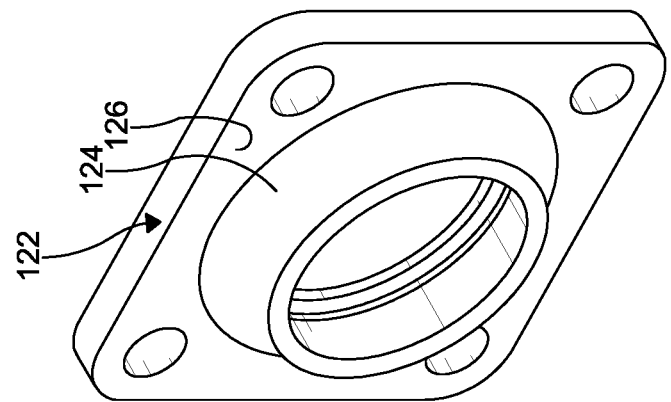
Figure 6:
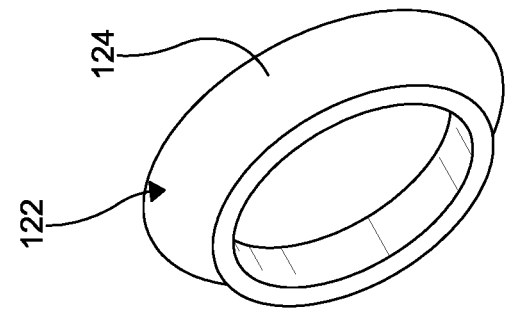
Figure 10:
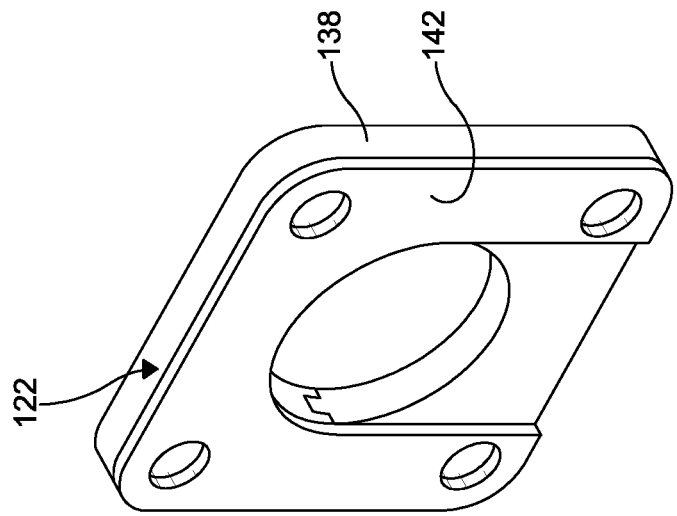
Figure 9:
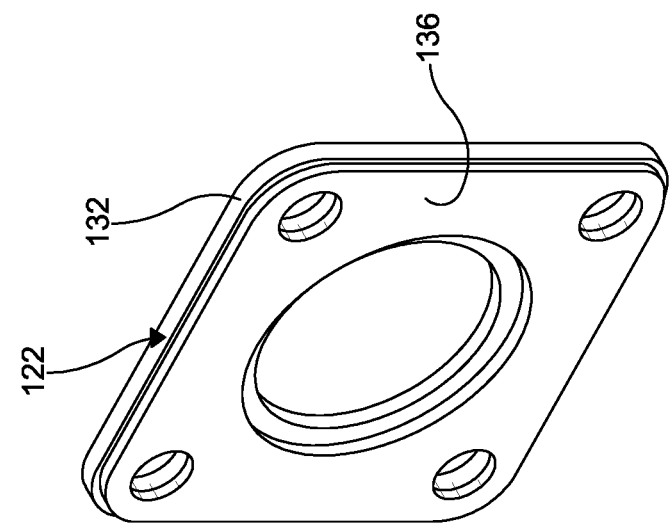
Figure 11:
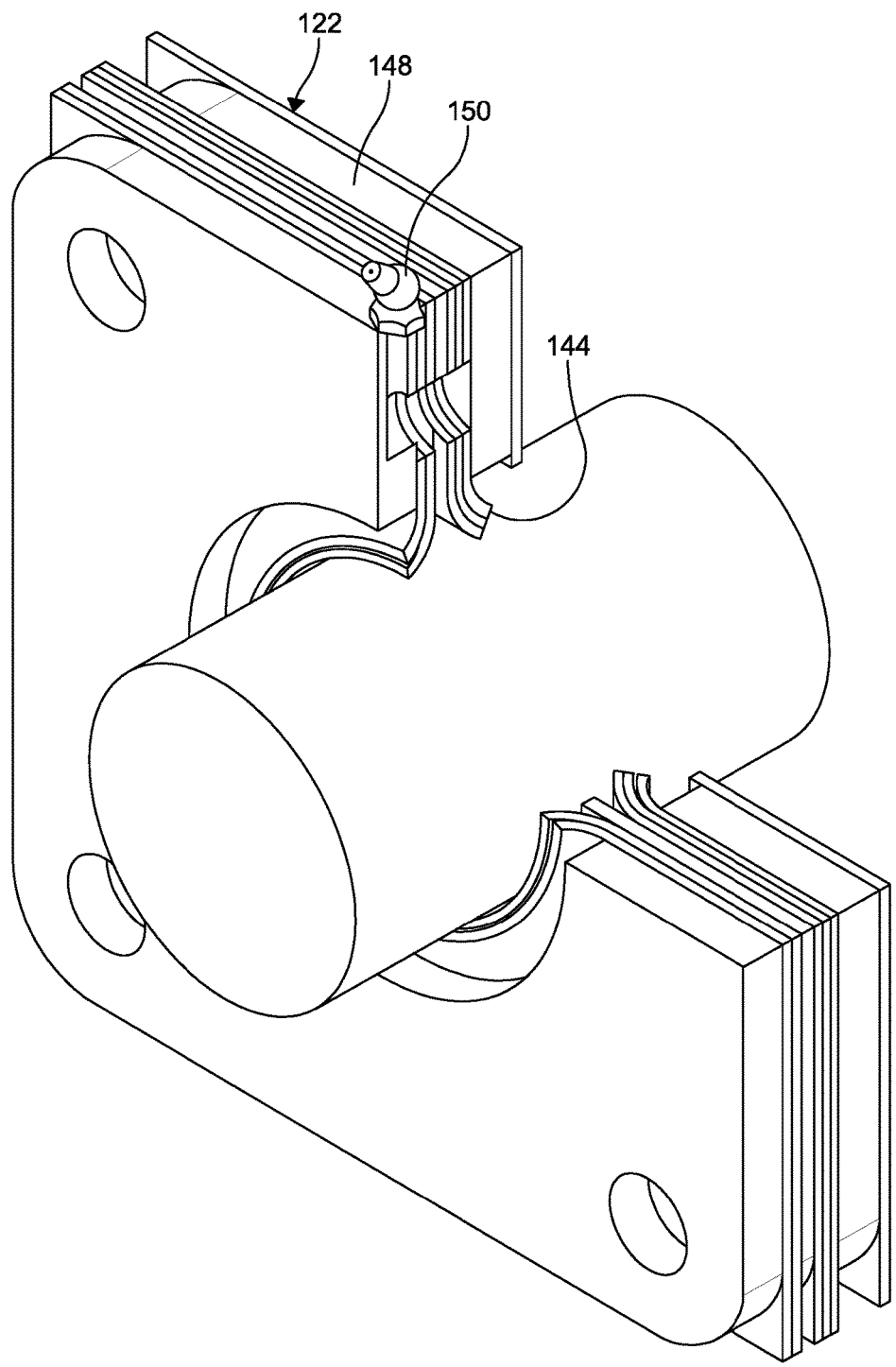

Various types of seals can be employed for the seal 122 in the present invention such as the types of seals shown in FIGS. 6-11, for example. The seal 122 can be an elastomeric sealing element 124 as shown in FIG. 6, an elastomeric sealing element 124 with a removable and replaceable housing 126 as shown in FIG. 7, a pressed, elastomeric sealing element 128 in a housing 130 as shown in FIG. 8, a sealing element 132 with a reinforcement plate 136 as shown in FIG. 9, a multi-piece sealing element 138 with a U-shaped reinforcement plate 142 to permit removal of the seal 122 without removing a shaft inserted therethrough as shown in FIG. 10, and a multilayer, sealing element 144 with a plurality of reinforcement plates 148 and a lubrication fitting or zerk fitting 150. It is understood that the sealing elements 124, 128, 132, 138, 144 can be produced from any elastomeric material or thermally stable, wear resistant, non-sparking, self-lubricating material such as nylon, bronze, oil impregnated bronze, other suitable bronze alloys, polytetrafluoroethylene (PTFE), and ultra-high molecular weight polyethylene (UHMW), for example. It is further understood that other types of seals than shown can be employed in the present invention as desired. One of ordinary skill in the art should further understand that more than one seal 122 and more than one type of seal may be used within the scope of the invention.

In use, the material 19 to be conveyed within the belt conveyor system 10 is loaded onto the conveyor belt 17 through the material inlet 21. The material 19 is carried from the material inlet 21 to a desired location. Once the material 19 has reached the desired location, the material 19 is then discharged over the driving pulley into the discharge spout. However, the material 19 being conveyed can be loaded onto the conveyor belt 17 through at least one material inlet 21 and/or discharged from the belt conveyor system 10 through at least one discharge spout located at any point, or multiple points, along the conveying run of the belt conveyor system 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A belt conveyor system, comprising:
a main housing; and
a troughing idler assembly disposed in the main housing, the troughing idler assembly including at least one roller supported by a first bearing having a first face and a second face and a second bearing having a first face and a second face, wherein the first bearing is mounted to an exterior of the main housing, wherein the first face and the second face of the first bearing are at least partially visible, and wherein at least one of the first bearing and the second bearing is disposed in a bearing bracket housing coupled to the main housing.

2. The belt conveyor system according to claim 1, wherein the first bearing is a pillow block bearing.

3. The belt conveyor system according to claim 1, wherein a seal is disposed in an opening formed in the bearing bracket housing to surround a shaft of the at least one roller.

4. The belt conveyor system according to claim 1, wherein the second bearing is mounted to the exterior of the main housing, wherein at least one of the first face and the second face of the second bearing is at least partially visible.

5. The belt conveyor system according to claim 1, wherein the second bearing is one of a pillow block bearing and a flange bearing.

6. The belt conveyor system according to claim 1, wherein the bearing bracket housing includes an upper wall, a plurality of side walls, and an end wall.

7. The belt conveyor system according to claim 6, wherein at least one of the first bearing and the second bearing is coupled to the upper wall of the bearing bracket housing.

8. A belt conveyor system, comprising:
a main housing having a conveyor belt disposed in an interior thereof;
a first bearing disposed outside of the main housing, wherein the first bearing has a first face and an opposing second face;
a second bearing disposed outside of the main housing and spaced apart from the first bearing, wherein second bearing has a first face and an opposing second face, and wherein the faces of at least one of the first bearing and the second bearing are at least partially visible; and
a seal disposed adjacent the main housing separating the interior of the main housing from the bearings.

9. A belt conveyor system, comprising:
a main housing having conveyor belt disposed therein; and at least one roller disposed in the main housing adjacent the conveyor belt, the at least one roller having an end supported by a first bearing and a second bearing, wherein the first bearing has a first face and an opposing second face and the second bearing has a first face and an opposing second face, wherein the faces of the first bearing and the faces of the second bearing are at least partially visible.

10. The belt conveyor system according to claim 9, wherein the first bearing is spaced apart from the second bearing along the end of the at least one roller.

11. The belt conveyor system according to claim 10, wherein at least one of the first bearing and the second bearing is disposed in a bearing bracket housing.

12. The belt conveyor system according to claim 11, wherein the bearing bracket housing includes an upper wall, a plurality of side walls, and an end wall.

13. The belt conveyor system according to claim 12, wherein the first bearing is coupled to the upper wall of the bearing bracket housing.

14. The belt conveyor system according to claim 11, wherein a seal is disposed in an opening formed in the bearing bracket housing between at least one of the bearings and an interior of the main housing.

* * * * *

UNITED STATES PATENT AND TRADEMARK OFFICE
CERTIFICATE OF CORRECTION

PATENT NO. : 10,246,265 B2
APPLICATION NO. : 15/863620
DATED : April 2, 2019
INVENTOR(S) : Joshua Norman Schnitkey It is certified that error appears in the above-identified patent and that said Letters Patent is hereby corrected as shown below:

In the Claims

Claim 11, Column 7, Line 12, "10" should be deleted and replaced with "9"

Signed and Sealed this
Eighth Day of October, 2019

Andrei Iancu
*Director of the United States Patent and Trademark Office*